(12) United States Patent
Freudelsperger

(10) Patent No.: US 7,540,375 B2
(45) Date of Patent: Jun. 2, 2009

(54) DIRECTIONAL-CHANGE IN ROLLER CONVEYOR INSTALLATION

(75) Inventor: Karl Freudelsperger, Hart bei Graz (AT)

(73) Assignee: Knapp Logistik Automation GmbH, Hart bei Graz (AU)

( * ) Notice: Subject to any disclaimer, the term of this patent is extended or adjusted under 35 U.S.C. 154(b) by 62 days.

(21) Appl. No.: 11/910,030

(22) PCT Filed: Apr. 20, 2006

(86) PCT No.: PCT/EP2006/003606
§ 371 (c)(1),
(2), (4) Date: Sep. 28, 2007

(87) PCT Pub. No.: WO2006/114233
PCT Pub. Date: Nov. 2, 2006

(65) Prior Publication Data
US 2008/0164126 A1 Jul. 10, 2008

(30) Foreign Application Priority Data
Apr. 23, 2005 (DE) .................. 10 2005 019 068

(51) Int. Cl.
*B65G 21/16* (2006.01)
(52) U.S. Cl. ...................... 198/831; 198/790
(58) Field of Classification Search .......... 198/831, 198/790, 781.03, 781.09, 861.1
See application file for complete search history.

(56) References Cited

U.S. PATENT DOCUMENTS

| | | | | |
|---|---|---|---|---|
| 4,096,942 A | | 6/1978 | Shepherd | |
| 5,826,702 A | * | 10/1998 | Gibson et al. | 198/787 |
| 6,162,157 A | * | 12/2000 | Morisod | 493/180 |
| 6,390,286 B1 | * | 5/2002 | Nguyen et al. | 198/81.08 |
| 6,565,689 B2 | * | 5/2003 | Geib et al. | 198/853 |
| 7,398,874 B2 | * | 7/2008 | Deur | 198/780 |
| 2002/0134649 A1 | | 9/2002 | Nguyen et al. | |
| 2003/0192774 A1 | | 10/2003 | Cotter et al. | |

FOREIGN PATENT DOCUMENTS

| | | |
|---|---|---|
| DE | 12 71 577 B | 6/1968 |
| DE | 17 56 519 A1 | 3/1970 |
| JP | 2-233408 | 9/1990 |

* cited by examiner

*Primary Examiner*—James R Bidwell
(74) *Attorney, Agent, or Firm*—McGlew and Tuttle, P.C.

(57) ABSTRACT

A roller conveyor installation (1) includes a curved roller conveyor (2) for conveying piece goods, optionally from a first conveying strip to a second conveying strip oriented in a different direction. The first and second conveying strips are roller conveyors (3, 4) with driven rollers (9) that extend at an angle to the conveying strip. The curved roller conveyor (2) includes, at an angle to the conveying strip, radially extending, spaced-apart individual rollers (5) that are driven by a common revolving driving belt. A revolving driving belt is configured as a V-belt (6) which is guided in coaxial drive rollers (13) or coaxial peripheral sections of the individual rollers (5) both at the upper end in the V-belt upper strand (6a) and at the bottom end in the V-belt lower strand (6b) in the same V-belt guide. The V-belt (6) is held in the V-belt guide from above in the V-belt upper strand (6a) and from below in the V-belt lower strand (6b) by floating upper or lower press rollers (14). The press rollers (14) lie between the individual rollers (5) and are rotationally fastened on a preferably radial outer curve frame part (15) of the curved roller conveyor (2).

17 Claims, 3 Drawing Sheets

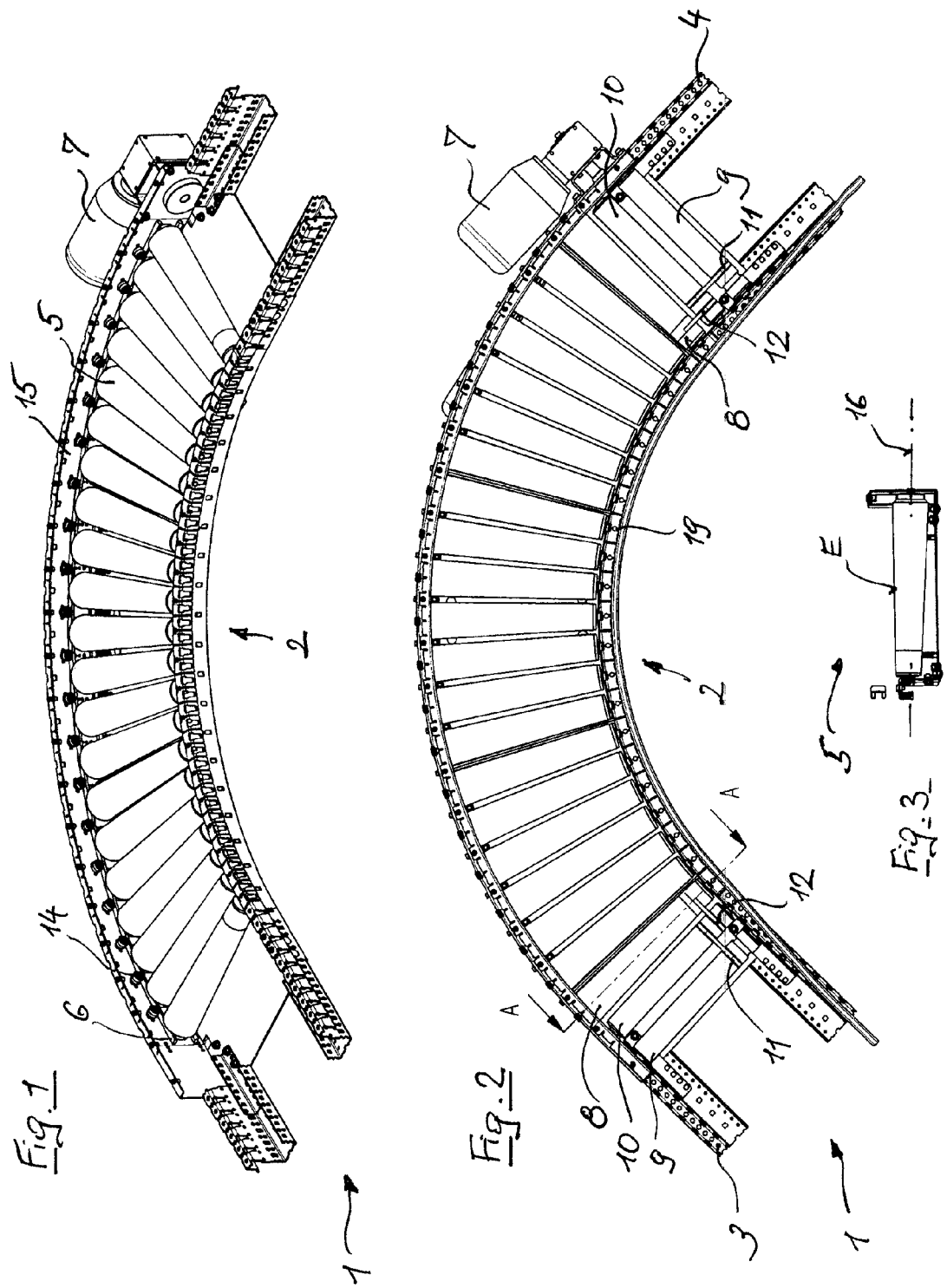

DIRECTIONAL-CHANGE IN ROLLER CONVEYOR INSTALLATION

CROSS REFERENCE TO RELATED APPLICATIONS

This application is a United States National Phase application of International Application PCT/EP2006/003606 and claims the benefit of priority under 35 U.S.C. § 119 of German Patent Application DE 10 2005 019 068.5 filed Apr. 23, 2005, the entire contents of which are incorporated herein by reference.

FIELD OF THE INVENTION

The present invention pertains to a roller conveying means (roller conveying device or installation) with a curved roller conveyor for individually packaged products, optionally from a first conveying section to a differently directed, second conveying section, wherein the first and second conveying sections are roller conveyors with driven rollers extending at right angles to the conveyor track and the curved roller conveyor has individual rollers, which are located at spaced locations from one another, extend radially at right angles to the conveyor track and are driven via a common, circulating drive belt.

BACKGROUND OF THE INVENTION

In prior-art roller conveying devices, the transfer between longitudinal and cross roller conveyors takes place by means of rotary tables, which pick up the individually packaged products or the carrier for the individually packaged products when the rotary tables are stopped and pivot them slowly about the center of the individually packaged product or along an arc into the release direction of the second conveyor track in order to release the individually packaged product there.

SUMMARY OF THE INVENTION

The basic object of the present invention is to provide a roller conveying device with curved roller conveyor of the type described in the introduction, whose deflection section has a very simple design and can nevertheless be operated reliably.

The basic object of the present invention is accomplished by a roller conveying device including a curved roller conveyor designed with a V-belt as a circulating drive belt and with a special belt guide.

In particular, the V-belt is guided in coaxial drive rollers or coaxial drive jacket sections of the individual rollers both at the top at the V-belt carrying run and at the bottom at the empty belt in the same V-belt guide, the V-belt being held up in the V-belt guide from the top at the carrying V-belt and from the bottom at the empty V-belt via loose upper and lower pressing rollers. The carrying run of the V-belt is hung here into the coaxial drive rollers or drive jacket sections of the individual rollers from the top. If separate coaxial drive rollers are provided, the drive roller and the corresponding individual roller are rigidly connected to one another. The pressing rollers are located in two planes between the individual rollers and are rotatably fastened to a preferably radially outer curved frame part of the curved roller conveyor.

Such a restrictedly guided V-belt is a reliable and yet flexible individual roller drive means especially along the curved path and permits sufficient crosswise bending along the curved path. The V-belt is supported two-dimensionally along the curved path in the V-belt guide mainly at the radially inner conical flank of the V-belt drive, as a result of which a sufficient frictional engagement develops in the V-belt drive. The radially outer conical flank of the V-belt drive can often be eliminated.

The V-belt guide may consequently preferably consist of a radially inner flank and a bottom-side dog.

The pressing rollers are preferably adjustable in the vertical direction for setting the belt tension.

At least one individual roller is preferably removed for vertically adjusting the pressing rollers. The V-belt is now loose and permits the pressing rollers to be adjusted in a simple manner. After adjustment, the removed individual roller is re-inserted into the system and the V-belt is tightened in the process.

The individual rollers can be easily removed and re-inserted when the axes of the individual rollers of the curved roller conveyor have plug-in shoes at the longitudinal ends, which are detachably plugged from the top into positive-locking recesses or plug-in pockets in or at longitudinal side frame parts of the conveying means.

The V-belt is preferably in a drive connection with at least one of the two roller conveyors, the drive connection preferably having at least one belt changeover between two adjacent end rollers of the curved roller conveyor and of the adjacent roller conveyor.

While the carrying run of the V-belt preferably drives the individual rollers of the curved rolled-type conveyor radially on the outside, the above-mentioned drive connection is located radially inside.

The individual rollers may be cylindrical or conical individual rollers.

The advantage of the small overall height and the very simple design is given in the present invention, as a result of which a high degree of service is attained. The reason for this is, among other things, the fact that driving is by means of a V-belt system. The V-belt is driven via a motor. The V-belt is positioned at the outer radius. The power transmission to the individual rollers takes place by means of small pressing rollers, which are arranged between the cylindrical or conical rollers on the upper side and the bottom side.

Other advantageous features of the present invention appear from the following description, in which preferred exemplary embodiments of the present invention are explained in more detail on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic perspective view of a first embodiment variant of a roller conveying device in the area of a curved roller conveyor;

FIG. 2 is a top view of the roller conveying device according to FIG. 1;

FIG. 3 is a vertical section along line A-A in FIG. 2;

DESCRIPTION OF THE PREFERRED EMBODIMENTS

Figure 4:
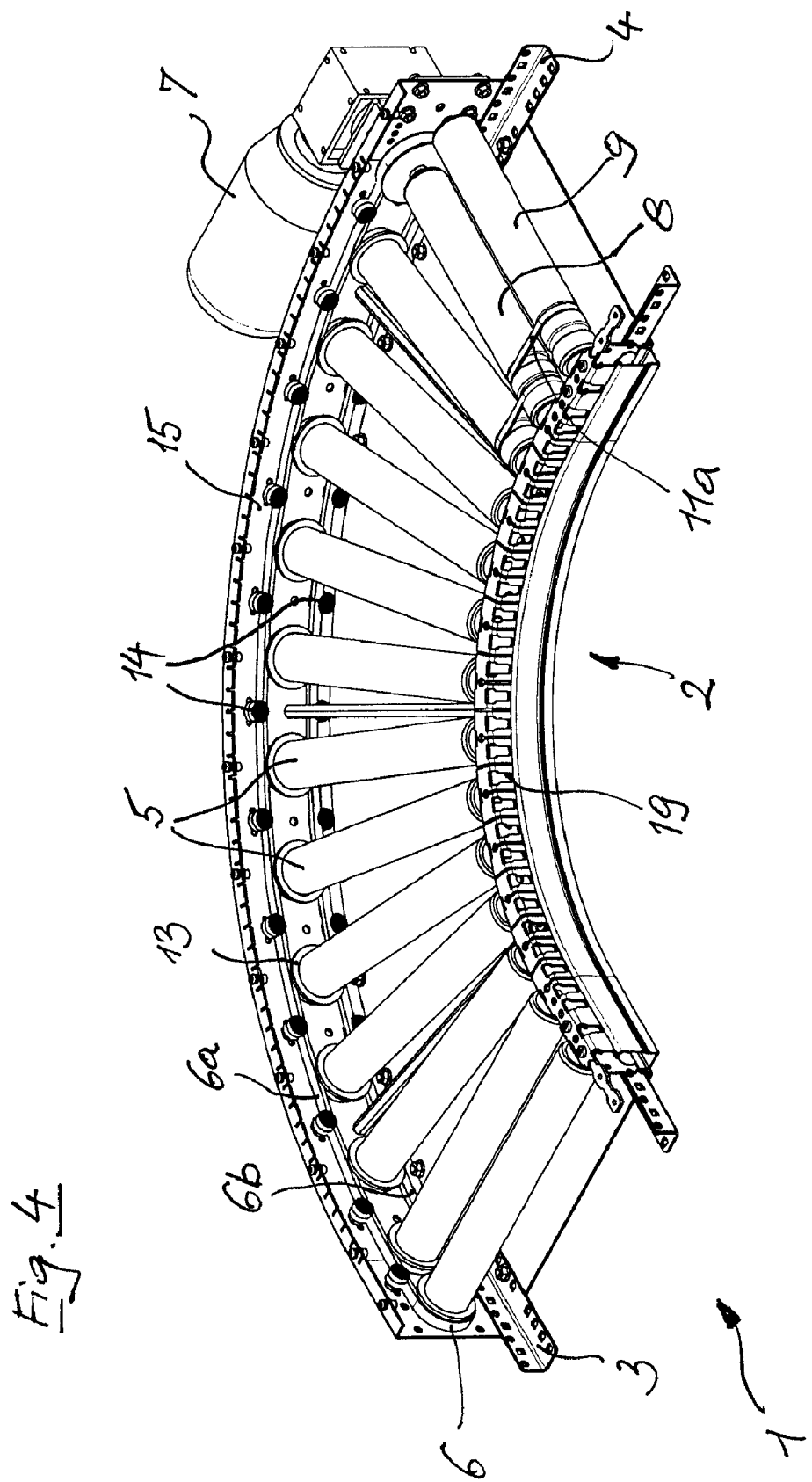
FIG. 4 is a second embodiment variant of the roller conveying device in the area of a curved roller conveyor in a perspective view similar to that in FIG. 1.

Referring to the drawings in particular, a roller conveying device 1 with change in direction for conveying individually packaged products from a first conveying section via a deflecting element to a second conveying section directed at right angles to the first conveying section is provided in the form of roller conveyors 3, 4, which are equipped with driven rollers 9 extending at right angles to the conveyor track.

The deflecting element is a curved roller conveyor 2, which has individual rollers 5, which are located at spaced locations from one another, extend radially at right angles to the conveyor track and are driven via a common circulating drive belt in the form of a V-belt 6.

The V-belt 6 is in drive connection with the two roller conveyors 3, 4, and a single drive 7 is provided for both the first roller conveyor and for the second roller conveyor 3, 4 as well as for the curved roller conveyor 2 arranged between them.

The drive connection has, according to FIG. 4, at least one belt changeover 11a between two adjacent end rollers 8, 9 of the curved roller conveyor 2 and of the adjacent roller conveyor 3 and 4, respectively.

In particular, to bridge over the space between the two adjacent end rollers 8, 9 of the curved roller conveyor 2 and of the roller conveyor, an intermediate roller 10 of the type of the roller conveyors according to FIG. 2 is provided, which is connected to the end roller 9 of the roller conveyor 3 or 4 via a first belt changeover 11 and to the end roller 8 of the curved roller conveyor 2 via a second belt changeover 12.

Both the carrying run 6a and the empty belt 6b of the V-belt 6 drive the individual rollers 5 of the curved roller conveyor 2 radially on the outside.

The carrying run 6a and the empty belt 6b of the V-belt are guided in coaxial drive rollers 13 of the individual rollers 5, and each drive roller 13 is connected to the corresponding coaxial individual roller 5 in an axially rigid manner.

The carrying run 6a and the empty belt 6b of the V-belt are guided and held at the drive rollers 13 or drive jacket sections of the individual rollers 5 from the top and from the bottom via loose pressing rollers 14, which are rotatably fastened to the outer curved frame part 15 of the curved roller conveyor 2 at the top and at the bottom.

The pressing rollers 14 are each located between two adjacent individual rollers 5 and are vertically adjustable and hence can be set relative to the V-belt 6.

While the V-belt 6 extends radially on the outside, the drive connection between two adjacent end rollers 8, 9 of the curved roller conveyor 2 and the adjacent roller conveyor 3 and 4, respectively, is located radially on the inside.

Like the V-belt 6, the belt changeovers 11, 11a, 12 are also designed, in an especially advantageous variant, as V-belts, which likewise drivingly mesh with correspondingly profiled drive rollers 13 or drive jacket sections of the individual rollers 5.

While the curved roller conveyor 2 according to the embodiment variant shown in FIG. 4 has cylindrical individual rollers of the type of the adjacent roller conveyor 2, the curved roller conveyor 2 according to the exemplary embodiment shown in FIGS. 1 through 3 is characterized by conical individual rollers, whose larger diameter is located radially on the outside.

The conveyor track of the curved roller conveyor 2 with the conical individual rollers is located in a plane E according to FIG. 3 such that the axes 16 of the conical individual rollers extend radially outwardly and obliquely downwardly.

The drive rollers of the conical individual rollers have a diameter corresponding to the diameter of the rollers of the roller conveyors.

The V-belt 6 and the belt changeovers may optionally be operated at equal circumferential velocity.

Cylindrical individual rollers are preferably operated at the same circumferential velocity as the rollers of the roller conveyors.

The circumferential velocity of the conical individual rollers in the middle of the conveyor track may be preferably equal to the circumferential velocity of the rollers of the roller conveyors.

Figure 5:
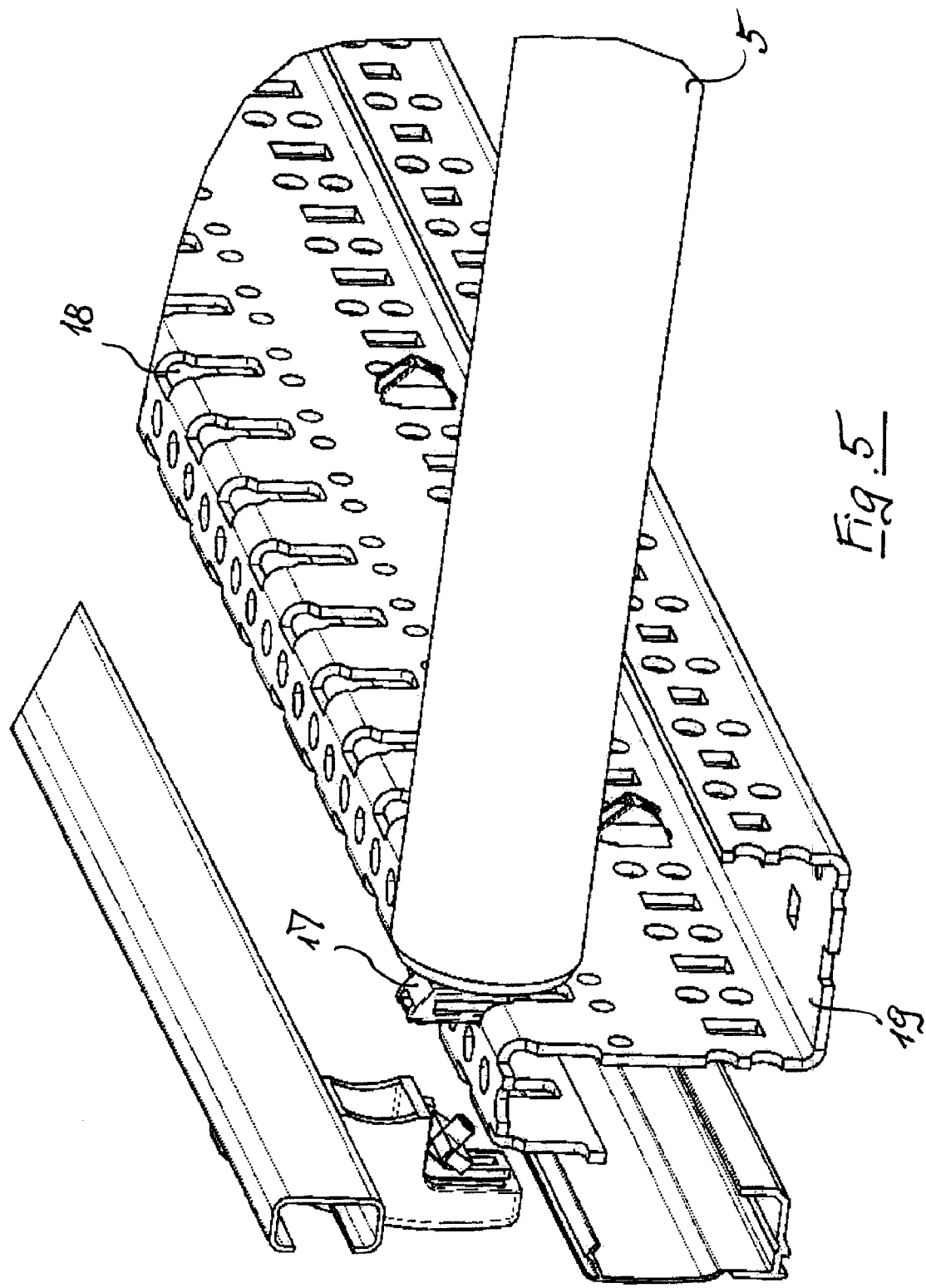
FIG. 5 is an enlarged perspective view of a detail.

In particular, the axes of the individual rollers of the curved roller conveyor and the axes of the rollers of the roller conveyors may have plug-in shoes 17 according to FIG. 5 at the longitudinal ends, which can be detachably inserted from the top into positive-locking recesses 18 or plug-in pockets in or at longitudinal side frame parts 19 of the conveying means. As a result, individual rollers 5 of the conveying means can be removed by severing the plug-type connection of the individual rollers for maintaining or setting the upper and lower pressing rollers 14 and the V-belt 6 including the belt changeovers and re-inserted after maintenance or setting.

While specific embodiments of the invention have been shown and described in detail to illustrate the application of the principles of the invention, it will be understood that the invention may be embodied otherwise without departing from such principles.

The invention claimed is:

1. A roller conveying device comprising:
 a first conveying section comprising a first roller conveyor with first driven rollers extending at a right angle to a first conveyor track;
 a second conveying section comprising a second roller conveyor with second driven rollers extending at a right angle to a second conveyor track, said second conveying section being differently directed from said first conveying section;
 a curved roller conveyor for conveying individually packaged products between said first conveying section and said second conveying section, said curved roller conveyor comprising a radially outer curved frame part, individual rollers located at spaced locations from one another, said individual rollers extending radially at right angles to a curved conveyor track, said individual rollers having one of coaxial drive rollers or coaxial drive jacket sections, loose upper and lower pressing rollers located between said individual rollers and a common circulating drive belt, said circulating drive belt comprising a V-belt, said V-belt being guided in a V-belt guide defined by said coaxial drive rollers or coaxial drive jacket sections of said individual rollers both at a top at a carrying run of said V-belt and at the bottom at an empty run of said V-belt, said V-belt being held up in the V-belt guide from the top at said carrying run of said V-belt and from the bottom at said empty run of said V-belt via said loose upper and lower pressing rollers, said pressing rollers being vertically adjustable and rotatably fastened to said radially outer curved frame part.

2. A roller conveying device in accordance with claim 1, wherein said pressing rollers are adjustable vertically on removal of at least one of said individual rollers.

3. A roller conveying device in accordance with claim 2, wherein the axes of said individual rollers have, at the longitudinal ends, plug-in shoes, which can be detachably inserted from the top into positive-locking recesses or plug-in pockets in or at longitudinal side frame parts of said curved roller conveyor, said longitudinal side frame parts being located opposite said curved frame part, wherein at least one said individual roller is removed by severing the plug-type connection for maintaining or setting the pressing rollers and/or the V-belt and is re-inserted after maintenance or setting.

4. A roller conveying device in accordance with claim 1, wherein said V-belt drivingly meshes with said correspondingly profiled drive rollers or drive jacket sections of said individual rollers at the top and at the bottom.

5. A roller conveying device in accordance with claim 1, wherein said V-belt is in drive connection with at least one of said two roller conveyors.

6. A roller conveying device in accordance with claim 5, further comprising a single drive provided for both said first and said second roller conveyors as well as for said curved roller conveyor arranged between said first and said second roller conveyors.

7. A roller conveying device in accordance with claim 5, wherein the drive connection has at least one belt changeover between two adjacent end rollers of said curved roller conveyor and an adjacent said roller conveyor.

8. A roller conveying device in accordance with claim 5, further comprising an intermediate roller of a type of said first and said second roller conveyors, said intermediate roller being connected to each respective end roller of said first and said second roller conveyors via a first belt changeover and to an end roller of said curved roller conveyor via a second belt changeover, said intermediate roller being provided between said two adjacent end rollers of said curved roller conveyor and of said roller conveyor.

9. A roller conveying device in accordance with claim 1, wherein the V-belt drives said individual rollers of said curved roller conveyor radially on the outside.

10. A roller conveying device in accordance with claim 9, wherein the drive connection between two adjacent end rollers of said curved roller conveyor and respective adjacent roller conveyor is located radially on the inside.

11. A roller conveying device in accordance with claim 1, wherein said individual rollers of said curved roller conveyor are cylindrical of a type of said adjacent roller first and second conveyors.

12. A roller conveying device in accordance with claim 1, wherein said curved roller conveyor has conical individual rollers, whose larger diameter is radially on the outside.

13. A roller conveying device in accordance with claim 12, wherein the curved conveyor track of said curved roller conveyor is located in a plane, wherein axes of said conical individual rollers extend radially outwardly and obliquely downwardly.

14. A roller conveying device in accordance with claim 12, wherein the drive rollers of the conical individual rollers have a diameter corresponding to the diameter of the rollers of the roller conveyors.

15. A roller conveying device in accordance with 8, wherein the V-belt and the belt changeovers are operated at the same circumferential velocity.

16. A roller conveying device in accordance with claim 11, wherein the cylindrical individual rollers are operated at the same circumferential velocity as the rollers of the roller conveyors.

17. A roller conveying device in accordance with one of the claims 12, wherein the circumferential velocity of the conical individual rollers in the middle of the conveyor track is equal to the circumferential velocity of the rollers of the roller conveyors.

* * * * *